Figure 1:
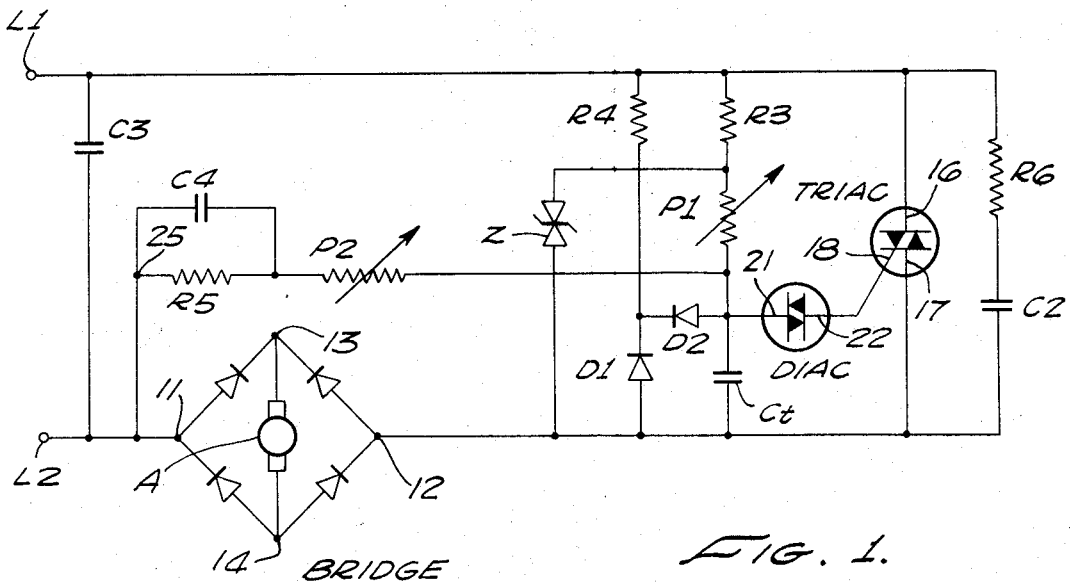

United States Patent [19]
Mason

[11] 3,783,361
[45] Jan. 1, 1974

[54] TRIAC MOTOR SPEED CONTROL

[75] Inventor: Raymond J. Mason, Lynnwood, Calif.

[73] Assignee: Minarik Electric Co., Los Angeles, Calif.

[22] Filed: Apr. 24, 1972

[21] Appl. No.: 246,892

[52] U.S. Cl. ................................................ 318/331
[51] Int. Cl. ............................................. H02p 5/16
[58] Field of Search ............................. 318/331, 345

[56] References Cited
UNITED STATES PATENTS

| | | | |
|---|---|---|---|
| 3,529,225 | 9/1970 | Mohan | 318/331 |
| 3,621,355 | 11/1971 | Dinger | 318/345 |
| 3,697,864 | 10/1972 | Dinger | 318/331 |
| 3,634,874 | 1/1972 | Mason | 318/345 |

Primary Examiner—Bernard A. Gilheany
Assistant Examiner—Thomas Langer
Attorney—Vernon D. Beehler et al.

[57] ABSTRACT

A motor speed control including a full wave diode bridge rectifier for rectifying alternating current received from a supply circuit, a triac coupled in a series loop circuit with the bridge rectifier and the supply line for controlling the flow of current through the bridge rectifier during both positive and negative half-cycles of the supply line voltage, a control circuit including a diac coupled in series with a timing capacitor for controlling the firing of the triac, and a feed back loop coupled between the junction of the diac and timing capacitor and the negative output terminal of the bridge circuit.

7 Claims, 2 Drawing Figures

TRIAC MOTOR SPEED CONTROL

BACKGROUND OF THE INVENTION

During the past several years it has become well known to utilize a Triac for controlling a power supply circuit which operates on full-wave alternating current, with the firing of the Triac during each half of the cycle being controlled by a diac. The breakdown of the diac is, in turn, accomplished by the charge stored on a timing capacitor which is part of an RC circuit coupled generally in parallel with the Triac. In that well-known basic circuit the firing of the diac, and hence of the Triac, is controlled in response to a control signal developed as a function of either the line voltage or the voltage appearing across the Triac.

According to the present invention Triac circuits are applied to the problem of motor speed control. There are many applications of electric motors where the mechanical load on the motor may vary but it is desirable to maintain the motor speed constant. Such an electric motor may, for example, be a direct-current motor of either the permanent magnet or wound field type, or an alternating-current motor of either the shaded pole or repulsion type. If voltage is simply maintained as the motor load increases the result is a drop in motor speed, and in order to maintain the speed constant it is necessary to actually increase the voltage supplied to the motor.

According to the present invention a control signal is developed as a function of the voltage appearing across the supply line or across the Triac by utilizing an RC circuit which is charged first in one direction and then in the other, and this control signal is stored on the timing capacitor and applied to the diac in essentially the same manner as heretofore known. There is also additional circuitry which develops a regenerative feedback signal, which is combined with the traditional control signal so that the precise point of time in each half-cycle when the Triac fires is determined as a composite function of the two signals. A more precise control of the motor speed, as mechanical load on the motor changes is therefore achieved.

The control circuit of the present invention has certain features which are also disclosed in my earlier U.S. Pat. application Ser. No. 7,740, filed Feb. 2, 1970 now U.S. Pat. No. 3,678,360 and entitled "Triac Controlled Power Supply Circuits."

The utilization of regenerative feedback signals is disclosed in my U.S. Pat. application Ser. No. 58,257, filed July 27, 1970 entitled "Triac Motor Speed Control" and issued as Pat. No. 3,634,874 on Jan. 11, 1972. The present invention is a specific improvement over the circuits shown in that patent.

DRAWING SUMMARY

Figure 2:
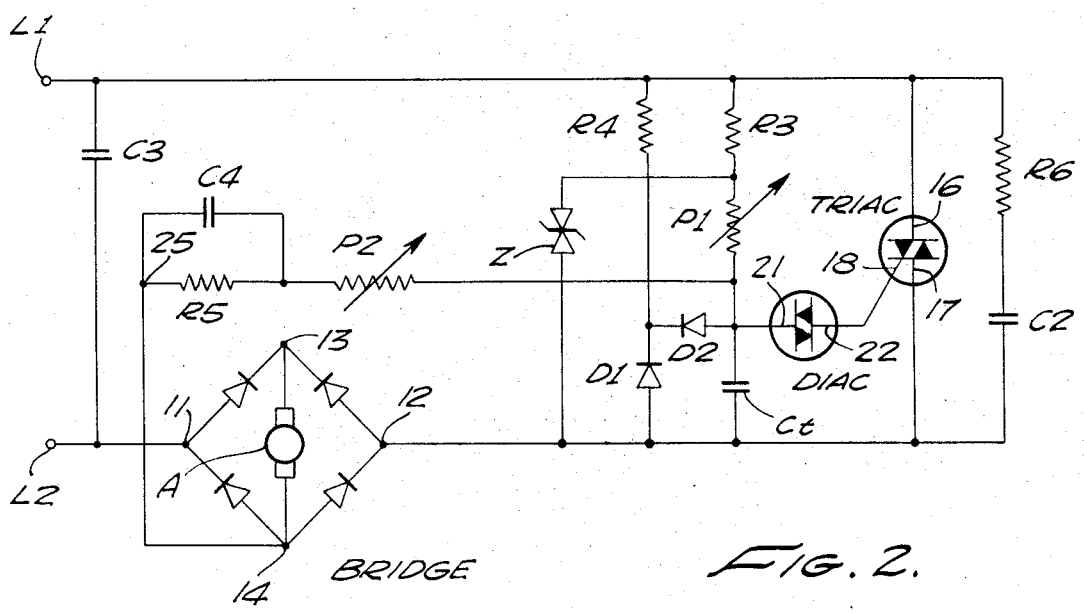

FIG. 1 is a schematic diagram of a motor speed control circuit as shown in my issued U.S. Pat. No. 3,634,874; and FIG. 2 is a schematic diagram of a motor speed control circuit provided in accordance with the present invention.

GENERAL OPERATION

The structure and operation of the circuit of FIG. 1 are described in detail in my U.S. Pat. No. 3,634,874 and need not be repeated here. The supply line terminals are designated L1, L2. The Triac has main current terminals 16, 17 and a control gate 18. In the control circuit the timing capacitor is designated $C_t$ while the Diac has electrodes 21, 22. A reset circuit for resetting the timing capacitor $C_t$ at the end of each positive half-cycle includes resistor R4 and diodes D1 and D2. Line voltage regulation is provided by the zener diodes Z in conjunction with resistor R3. Potentiometer P1 acts as a speed-setting potentiometer. Resistor R-6 and capacitor C2 provide $dV/dt$ circuit to prevent false triggering of the Triac. A feedback loop for providing a regenerative feedback signal includes a potentiometer P2 connected in series with the parallel combination of resistor R5 and capacitor C4.

It will be noted that in the circuit of FIG. 1 the feedback loop is connected between the juncture of potentiometer P1 and the timing capacitor $C_t$, and input terminal 11 of the bridge rectifier circuit.

PREFERRED EMBODIMENT — FIG. 2

Reference is now made to FIG. 2 illustrating the preferred embodiment of the invention.

In the feedback loop the parallel combination of R5 and C4 is connected to one end of potentiometer P2. The other end of the parallel combination of R5 and C4 is designated by the numeral 25. It will be seen that in FIG. 2 the junction point 25 is connected to an output terminal of the bridge rectifier, rather than to one of its input terminals. More specifically, it is connected to the negative output terminal 14 of the bridge rectifier.

I have found the circuit of FIG. 1 to be very satisfactory when used with permanent magnet motors. When used with shunt motors, however, the resulting operation is not entirely desirable.

Some shunt wound motors have high reactance windings, which present a large inductive load to the driving circuit. Perhaps this is the reason that the circuit of FIG. 1 does not operate well with such a motor as its load. But whatever the reason, I have found that by using the modified form of the circuit as shown in FIG. 2 the operation is greatly improved.

Specifically, the problem which was encountered in using the circuit of FIG. 1 with a shunt motor load was that there would be a significant oscillating or hunting action of the armature. No doubt this type of operation resulted from the regenerative feedback signal that is developed by the circuit of FIG. 1. I have found that by using the circuit of FIG. 2 the problem is substantially eliminated.

At the present time I have used my new feedback connection only in the specific circuit of FIG. 2, however, I am sure that it would be useful in other similar circuits where the same hunting or oscillating problem is encountered.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A triac motor speed control circuit comprising:
    a pair of supply line terminals;
    a triac;
    a diode bridge rectifier, the input terminals of said bridge rectifier being coupled in a series loop with the main current path of said triac across said pair of supply line terminals;

a diac having one terminal coupled to the control gate of said triac;

a speed potentiometer and a timing capacitor coupled together in series, said timing capacitor being connected between the other terminal of said diac and one main current terminal of said triac, said bridge rectifier being also coupled to said one main current terminal of said triac;

means for coupling a motor armature to the output terminals of said bridge rectifier;

a reset circuit including a resistor and a first diode coupled in series with each other and in parallel with the main current path of said triac, and a second diode having one terminal connected to the juncture of said resistor and said first diode in polarity opposite to that of said first diode, and its other terminal connected to the other terminal of said diac;

a line voltage compensation circuit having a resistor and a back-to-back pair of Zener diodes connected in series, the series combination thereof being coupled in parallel with the main current terminals of said triac, the series combination of said speed potentiometer and said timing capacitor being connected in parallel with said Zener diodes; and a feedback loop connected between said other terminal of said diac and the negative output terminal of said bridge rectifier.

2. A motor speed control circuit as claimed in claim 1 wherein said feedback loop includes a fixed resistor, a capacitor in parallel with said fixed resistor, and a variable resistor in series with said fixed resistor.

3. A triac motor speed control circuit comprising:
a pair of supply line terminals;
a triac;
a diode bridge rectifier having its input terminals coupled in series with the main current path of said triac, the series combination of said bridge rectifier and said triac being coupled across said pair of supply line terminals;
a diac having one terminal coupled to the control gate of said triac;
a speed potentiometer and a timing capacitor coupled together in series, the series combination thereof being coupled in parallel to said triac, said timing capacitor being also connected between the other terminal of said diac and one main current terminal of said triac;
a reset circuit including a resistor and a first diode coupled in series with each other and in parallel with the main current path of said triac, and a second diode having one terminal connected to the juncture of said resistor and said first diode in polarity opposite to that of said first diode, and its other terminal connected to the other terminal of said diac;

a motor of a type such that it acts as a generator when current is not being supplied to its armature, the motor armature being coupled to the output terminals of said bridge rectifier;

and a feedback loop coupled between said other terminal of said diac and the negative output terminal of said bridge rectifier;

the operation being such that the counter electromotive force generated by said motor when said triac is nonconductive diminishes with increasing load on the motor thus tending to stabilize the motor speed.

4. A motor speed control circuit as claimed in claim 3 wherein said feedback loop includes a fixed resistor, a capacitor in parallel with said fixed resistor, and a variable resistor in series with said fixed resistor, said diode bridge rectifier being coupled to said one main current terminal of said triac.

5. A motor speed control circuit as claimed in claim 4 which further includes a line voltage compensation circuit having a resistor and a back-to-back pair of Zener diodes connected in series, the series combination thereof being coupled in parallel with the main current terminals of said triac, the series combination of said speed potentiometer and said timing capacitor being connected in parallel with said Zener diodes.

6. In a motor speed control circuit:
a diode bridge rectifier having input terminals and output terminals;
means for coupling a motor armature to the output terminals of said bridge rectifier;
a triac having its main current path coupled in series with the input terminals of said bridge rectifier;
a control circuit means for controlling the firing of said triac including a diac having one terminal connected to the control gate of said triac and another terminal, and a timing capacitor connected between the other terminal of said diac and the juncture of said bridge circuit and said triac main current path; and
a feedback loop coupled between said other terminal of said diac and the negative output terminal of said bridge circuit.

7. A motor speed control circuit as claimed in claim 6 wherein said feedback loop includes a fixed resistor, a capacitor in parallel with said fixed resistor, and a variable resistor in series with said fixed resistor.

* * * * *